United States Patent [19]

Brennan

[11] 4,243,733
[45] Jan. 6, 1981

[54] ELECTRODE STRUCTURES

[75] Inventor: Michael P. J. Brennan, Helsby, England

[73] Assignee: Chloride Silent Power Limited, London, England

[21] Appl. No.: 70,065

[22] Filed: Aug. 27, 1979

Related U.S. Application Data

[62] Division of Ser. No. 861,924, Dec. 19, 1977, Pat. No. 4,176,447.

[51] Int. Cl.³ .................................. H01M 4/00
[52] U.S. Cl. .................................. 429/94; 429/104
[58] Field of Search ............... 429/104, 103, 94, 127, 429/122, 218, 102, 209

[56] References Cited

U.S. PATENT DOCUMENTS

| | | | |
|---|---|---|---|
| 2,793,427 | 5/1957 | Marvin | 29/420.5 |
| 3,314,821 | 4/1967 | Lambert et al. | 429/209 X |
| 3,749,603 | 7/1973 | Stringham et al. | 429/104 |
| 3,982,957 | 9/1976 | Jones et al. | 429/31 X |
| 3,993,503 | 11/1976 | Ludwig | 429/103 |
| 4,118,545 | 10/1978 | Jones | 429/104 |
| 4,123,596 | 10/1978 | Robinson | 429/104 |

Primary Examiner—Anthony Skapars
Attorney, Agent, or Firm—Beveridge, DeGrandi, Kline & Lunsford

[57] ABSTRACT

In a sodium sulphur cell, a cathode electrode of annular form comprising a plurality of segments, each of trapezoidal form in cross-section and joined by webs along a longer edge of each segment so that the assembly is foldable to form a substantially annular structure. This electrode may be made by compressing a blanket or sheet of carbon or graphite felt or fibres in a heated mould, which is shaped to produce the segments joined by thin webs, the material being impregnated with sulphur or sodium polysulphide before or after insertion in the mould, and the material being cooled before removal from the mould. Alternatively, the segments may be formed from the blanket or sheet by using shaped rolls, the material being cooled, e.g. by water or air, as it leaves the rolls.

8 Claims, 7 Drawing Figures

ELECTRODE STRUCTURES

CROSS-REFERENCES TO RELATED APPLICATIONS

This application is divided out of application Ser. No. 861,924 filed Dec. 19, 1977 now U.S. Pat. No. 4,176,447.

BACKGROUND OF THE INVENTION

1. Field of the Invention

This invention relates to electrode structures for electro-chemical cells of the kind having an electrochemical reactant contained in a porous electronically-conducting matrix.

2. Prior Art

Such an electrode structure is used, for example, as a cathode electrode in cells having a molten alkali metal as the anode separated by a solid ionically-conductive membrane from the cathode. A typical example of such a cell is a sodium-sulphur cell in which the anode comprises sodium, which is molten at the operating temperature of the cell and in which the cathode comprises an electronically-conducting matrix, typically of carbon or graphite fibrous material impregnated with sulphur/polysulphides, the anode and cathode being separated by a solid electrolyte permitting the passage of sodium ions, for example, a beta-alumina. Because the sulphur/polysulphides has a poor electrical conductivity, it is necessary to provide an electronically-conductive matrix in the cathodic region, this matrix permitting the movement of the cathodic reactant, which is liquid at the operating temperature of the cell into the region adjacent the electrolyte surface where the electro-chemical reaction takes place, the conductive matrix providing an electronic path between this region and a current collector. Typically, the matrix is formed of carbon felt or carbon fibres or foamed carbon. See for example U.S. Pat. Nos. 3,982,957; 3,980,496; 3,985,575; 3,993,503; 4,052,535 and 4,123,596.

In a tubular sodium-sulphur cell, in which the solid electrolyte is in the form of an open-ended tube, it is possible to locate the cathodic reactant within the tube and the sodium outside or vice-versa (see for example U.S. Pat. No. 3,922,176). In either case, the matrix is held in contact with an electronically-conducting current collector to enable an external circuit to be connected to the cell. In the former case, this current collector is typically a solid cylindrical rod coaxial with the electrolyte tube. In the latter case, the current collector is typically a cylindrical metal sheath forming part of the outer casing of the cell. In both cases the cathodic reactant and the porous matrix are contained within a cylindrical annulus between the electrolyte tube and the current collector.

Within the sodium electrode it is preferable to provide a capillary means to maintain an adequate supply of liquid sodium over the entire surface area of one side of the solid electrolyte. In order to ensure efficient operation of this capillary means, it is desirable to initially fill the cell with sodium in liquid form. For safety reasons this operation is preferably performed before sulphur has been introduced into the cell. Because the melting point of sulphur (113° C.) is quite close to that of sodium (98° C.), stringent temperature control would be necessary during liquid sodium filling of a cell already containing sulphur to prevent local remelting of sulphur, which could constitute a fire hazard should the cell be subjected to accidental rough handling resulting in fracture of the ceramic. For the same reason, it is also undesirable to fill with liquid sulphur a cell that has been previously filled with liquid sodium.

There is a further disadvantage of filling a cell with liquid sulphur, which is that, on cooling of the cell to room temperature, the sulphur volume will diminish due to a large increase in density at the solidification temperature, and thermal contraction of the solid. The thermal expansion coefficient of beta-alumina electrolyte $(6.0 \times 10^{-6} \, K^{-1})$ is lower than that of sulphur $(6.4 \times 10^{-5} \, K^{-1})$ so that subsequent rewarming of the cell can result in the electrolyte being subjected to stresses that may exceed the ceramic strength. This effect will be particularly troublesome when the sulphur electrode is located within the electrolyte tube, as hoop stresses will be set up within the electrolyte, which calculations show may well exceed the electrolyte strength.

Yet another disadvantage of liquid filling is that the distribution of sulphur within the porous matrix cannot easily be made uniform. Because the volume of the cathodic reactant increases considerably (30%) during discharge to a composition of approximately $Na_2S_3$, it is necessary to provide within the sulphur electrode expansion space to accommodate this increase in volume. It is desirable that the expansion space and cathodic reactant be uniformly distributed throughout the volume of the sulphur electrode. This is not possible if the cell is filled with liquid sulphur, as gravity will ensure that this will accumulate in the lower regions of the cell.

It has been proposed in U.S. Pat. No. 4,118,545, to pack fibre material between layers of cloth to facilitate their handling and more specifically it has been proposed to utilise the cloth to join a plurality of elongate elements, along their length so that the assembly can be formed into an annular unit to fit within a cell. This assembly has to be impregnated with sulphur after it has been formed.

The problem of manufacture of the sulphur electrodes has been considered by D. Chatterji "Development of sodium-sulphur batteries for utility application" Electric Power Research Institute report EM—266 Dec. 1976, which describes a method in which a cylindrical solid plug of carbon felt plus sulphur is cast and an axial hole is drilled through it conforming to the electrolyte dimensions. An earlier EPRI report 127-2 of Dec. 1975 "Development Program for solid electrolyte Batteries" discloses a preformed cylindrical sulphur electrode manufactured by forming a composite of carbon felt and sulphur and then machining the composite to the precise dimensions required.

SUMMARY OF THE INVENTION

It is one of the objects of the present invention to provide an improved method of preforming an electrode structure, such as the cathode electrode structure of a sodium-sulphur cell, comprising a porous matrix impregnated with a material, which is liquid at the operating temperature of the cell.

According to the present invention, a method of making an annular electrode structure having a porous matrix of electronically-conductive material impregnated with an electro-chemical reactant material comprises the steps of shaping a sheet of the matrix material, and impregnating it, either before or after the shaping, with the reactant material, the shaping and impregnating being effected at a temperature above the melting point of the reactant material, cooling the impregnated shape to solidify the reactant, the shaping operation compressing the matrix material over its whole area and effecting greater compression of the material in preselected regions so that the matrix material is formed into a planar assembly of shaped segments, which are each a portion of an annulus, whereby the shaped segments are formable into the required annular structure.

According to one form of the invention, a method of making an annular electrode structure having a porous matrix of electronically-conductive material impregnated with an electro-chemical reactant material comprises the steps of shaping a sheet of the matrix material, and impregnating it, either before or after the shaping, with the reactant material, the shaping and impregnating being effected at a temperature above the melting point of the reactant material, cooling the impregnated shape to solidify the reactant, the shaping operation compressing the matrix material over its whole area and effecting greater compression of the material in preselected regions so that the matrix material is formed into a planar assembly of shaped segments joined by thin webs, the shaped segments each being a portion of an annulus with the webs forming hinges parallel to the axis of the annulus whereby the shaped structure is foldable to form the required annular structure.

The shaping may be effected, for example, by moulding in a heated mould. In this case, the matrix material may be impregnated before or after putting it in the mould. The moulding may be effected by putting a flat sheet of matrix material of substantially uniform thickness into a ribbed mould. When the mould is cooled, the shaped structure can be removed and folded about the webs joining the segments to form the required annular shape.

Another method of forming the required shaped structure is by passing a sheet of matrix material, impregnated with the reactant at a temperature above the melting point of the reactant, through shaped rolls to form the segments joined by webs, and cooling the shaped material as it leaves the rolls. The rolls may, for example comprise a pair with one cylindrical and the other having either circumferential or longitudinal ribs. In the case of the sulphur impregnated carbon or graphite fibre, the cooling of the material leaving the rolls is conveniently effected by a coolant fluid, for example by immersion in water or by directing a blast of cold air onto the material as it comes out of the rolls. The sulphur quickly cools and solidifies so that a shaped strip comprising a plurality of rigid segments joined by webs is produced. This may be cut to the required length and folded, using the webs as hinges, to form the required annular structures.

In making a cathode structure for a sodium sulphur cell having a sulphur-impregnated carbon or graphite fiber matrix, e.g. a graphite felt matrix, it has been found adequate to form the segments of trapezoidal section, i.e. having, in transverse section, two parallel sides one longer than the other, the webs being at the ends of the longer parallel side. When the shaped structure is put into a cell and raised to the operating temperature, the sulphur becomes molten and the matrix can expand slightly so as to conform to the required annular shape. Thus, it is possible to use a flat sheet of matrix material and to employ a simple mould having one major surface flat and the opposite surface with a plurality of parallel V-shaped projecting ribs. Similarly if rolls are employed, one roll is a plain cylinder and the other has a plurality of V-shaped cylindrical or longitudinal ribs.

According to a preferred form of the present invention, a method of making an annular electrode structure having a porous matrix of electronically-conductive material impregnated with an electro-chemical reactant material comprises the steps of enclosing a sheet of matrix material in a heated mould formed so as to compress the matrix material over its whole area and to effect greater compression of the material in preselected regions arranged so that the matrix material is formed into a planar assembly of shaped segments, admitting said reactant material in a molten state into said mould to impregnate the matrix segments and cooling the assembly to solidify the reactant material whereby substantially rigid shaped segments of impregnated matrix material are produced, the mould being shaped to leave the segments joined together by thin webs of compressed material. Where the material is highly compressed, it will retain this state on cooling, so leaving thin webs, which form hinges joining the segments.

The invention furthermore includes within its scope an apparatus for making an electrode structure by the above-described method and comprising a metal mould having heating means for heating the mould to a temperature between 100° C. and 400° C., the mould being shaped to define a plurality of similar segments joined by their webs, said mould being openable and having sealing means to form a gas-tight enclosure, means for evacuating air from the mould, and means for admitting a liquid material into the mould after the mould has been closed.

The invention furthermore includes within its scope an annular electrode structure having a porous matrix of electronically-conductive material impregnated with an electro-chemical reactant material, which is solid at room temperature and comprising a plurality of segments shaped as elongated members of trapezoidal form in cross-section, each of which segments is joined to at least one of its neighbouring segments along a longer edge of the segment, which edge is an edge defined by the end of the longer parallel side of the trapezoid in cross-section. In particular, this structure may be used for the cathode of a sodium sulphur cell, comprising a sulphur-impregnated fibrous carbon or graphite matrix in the form of a plurality of elongated segments of trapezoidal section joined by webs and foldable to form a substantially annular structure. When such an electrode structure is put in a sodium-sulphur cell and raised to the operating temperature of the cell, the sulphur melts so releasing the matrix material, which will expand slightly to fill the region in which the structure is based. Such an electrode assembly may thus readily be arranged within an annular region in a cell between a cylindrical tube of solid electrolyte material and a current collector. The current collector may be located inside the electrolyte tube or outside the electrolyte tube. In either case, the matrix material will expand radially a small distance sufficient to effect electrical contact with the current collector and to be in contact with the electrolyte tube.

The matrix material may be carbon or graphite fibres or carbon or graphite felt. Such material may readily be impregnated with molten sulphur by a gravity feed or by an injection technique. It is preferable, however, to evacuate air from the mould before admitting the molten sulphur.

Although reference has been made more specifically to the impregnation of a matrix material with sulphur, for a sodium-sulphur cell, the material might be impregnated with a suitable sodium sulphide, for example $Na_2S_3$, the mould being cooled to the appropriate temperature so that the impregnant is solidified before the assembly is removed from the mould.

For impregnating, with sulphur, a matrix material in a mould, the mould may conveniently be heated to a temperature in the region of 100° C. to 400° C. and molten sulphur injected into the mould. The melting point of sulphur is 113° C. but the matrix material can be impregnated by injection of molten sulphur even if the mould temperature is slightly below the melting point of the sulphur.

A particular advantage of this technique in which an annular electrode structure is formed of a plurality of segments is that it is then readily possible to arrange electrically-conductive sheet material in the space between the segments to form conductive inserts in the electrode structure as may be desired in some cases. Such sheet material must be chemically resistant to the cathodic reactant in the cell operating conditions and might comprise for example graphite foil or a suitable metal such as a nickel-based chrome or chrome-iron alloy. It may be desired also to arrange conductive sheet material over a cylindrical face of such an assembly. If this is the inner face and if the segments are joined by webs, a single pre-shaped sheet may be utilised extending over the appropriate faces and between the segments before they are formed into the annular assembly.

Considered from another aspect, the invention includes within its scope an annular cathode electrode for a sodium-sulphur cell comprising a plurality of segments, each of trapezoidal cross-section, of fibrous carbonaceous material, e.g. graphite felt or fibres, impregnated with sulphur or sodium polysulphides, the segments being shaped to form an annular structure with radially-extending surfaces of adjacent segments separated by electrically conductive sheet material which is chemically inert to the sulphur/polysulphides.

The invention furthermore includes within its scope an electrode structure formed by the above-described method.

DESCRIPTION OF THE PREFERRED EMBODIMENTS

Figure 1:
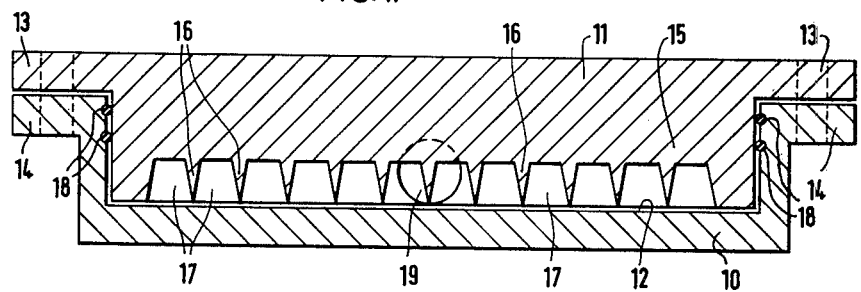
FIG. 1 is a cross-section through a mould for forming an electrode structure.

Referring to FIG. 1 there is shown diagrammatically in cross-section a mould for forming a cathode electrode structure for a sodium-sulphur cell. The mould comprises a female member 10 and a male member 11. The female member has a mould cavity of generally rectangular form and of uniform depth, the cavity having a flat base 12, which base is of rectangular form. The male member 11 has a flange 13 which mates with a co-operating flange 14 on the female member; securing means, e.g. bolts, are provided for securing the two flanges together. On the male member is a portion 15 generally in the form of a rectangular parallelepiped but with a plurality of ribs 16 which, when the mould is assembled, reach nearly to the flat base 12 of the female member. The spaces between the ribs 16 define elongate prism-shaped regions 17 of substantially trapezoidal cross-section. The mould is heated, for example by steam or electrical heating means (not shown) so that it can be maintained at a temperature typically between 100° and 400° C. Such heating means can comprise ducts through the metal mould structure. Seals, e.g. O-ring seals 18 around portion 15 of the male member ensures that the male and female members form a gas-tight structure.

To form an electrode structure, a flat sheet of carbon or graphite felt or carbon or graphite fibre material of uniform thickness is put over the surface 12 of the female mould member. The male mould member is then secured in position and the mould is heated to a suitable temperature, typically between 100° C. and 400° C. The mould is preferably evacuated and a low pressure injection or gravity feed is provided at one end of the mould for feeding molten sulphur through an aperture 19 into a header which is constituted by making the portion 15 of the male member slightly shorter than the cavity in the female member to leave a header region within the female member at the inlet end at which the sulphur is fed into the mould. When putting the sulphur in the mould, the mould is positioned with the aperture 18 and sulphur feed reservoir at the top, the sulphur flowing in under gravity. The flow may be assisted by the evacuation of air from the mould before filling, a suitable air extraction aperture and valve being provided in the mould for this purpose. The sulphur may be fed in from a heated reservoir, which may be pressurised with argon or other suitable inert gas. The sulphur flows downwardly and impregnates the carbon or graphite felt or fibers in the mould. The mould is then cooled and opened and the resultant preform withdrawn. Instead of feeding the sulphur in to the mould via a header, as described above, it may alternatively be directly injected into the mould.

Figure 2:
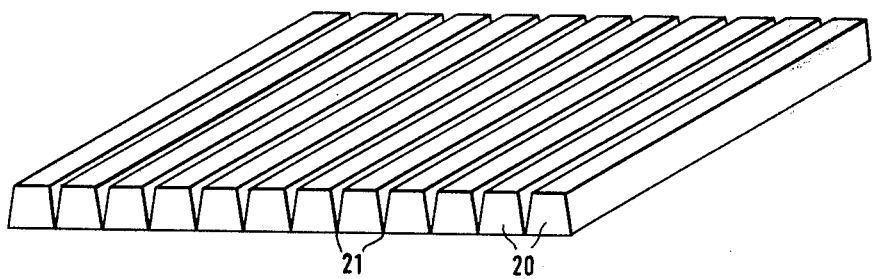
FIG. 2 is a perspective view illustrating an electrode assembly before being formed into an annular structure.
Figure 3:
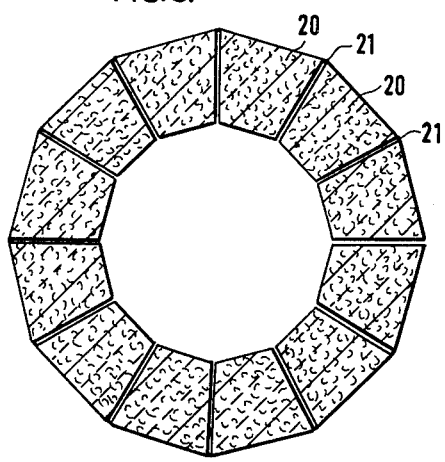
FIG. 3 is a diagram illustrating the assembly of FIG. 2 arranged as an annular structure.

FIG. 2 illustrates this preformed electrode assembly after it has cooled and been trimmed to remove any excess matrix material and sulphur in the header region of the mould. It will be seen that this electrode assembly comprises a plurality of similar elongate segments 20 of trapezoidal section having uniformly sloping sides and joined by thin webs 21 which are very short and which extend along the lengths of the segments joining adjacent segments at the edges thereof which extend through the corners (considering the trapezoidal section) formed by the ends of the longer of the two parallel faces. Because the sulphur has set to a solid, these segments are rigid and retain their shape. The very short webs 21, being of negligible length and joined to the rigid segments, do not expand and form hinges permitting the segments to be folded into an annular structure as shown in FIG. 3. It will be seen that the angles of the sloping sides of the trapezoid have been chosen so that these sides come into close contact and lie against one another when the annular assembly is formed. This particular annular assembly is shaped for use in a tubular sodium-sulphur cell and is put into the annular region between an electrolyte tube, typically a beta-alumina tube, and a current collector. The current collector might be an outer cylindrical housing within which the electrolyte tube is located but, in the particular cell for which the electrode assembly of FIG. 3 is to be used, the electrode assembly lies within the electrolyte tube around an inner current collector rod. The mould of FIG. 1 is dimensioned so as to preform the electrode assembly exactly of a size such that it may be slipped in position in the cell with appropriate small clearances on its inner and outer faces. When the cell is brought into use and is heated to its operating temperature, typically 350° C., the sulphur in the preform melts and the matrix material will expand slightly so as to come in contact both with the electrolyte tube and with the current collector.

If it is required to strengthen the webs, a strengthening sheet material may be included within the mould. Materials which can be used for this purpose include cloths, felts, yarns, mats, strings or papers of fibrous carbon, graphite, alumina, silica, boron nitride or other materials chemically resistant to the cathodic reactant.

Figure 4:
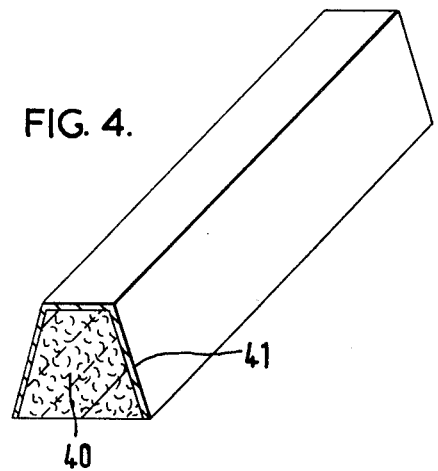
FIG. 4 illustrates a single segment of an assembly having a graphite foil layer.
Figure 5:
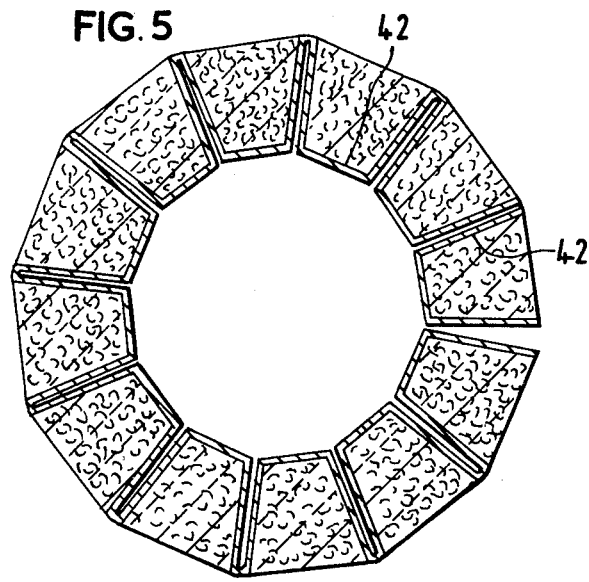
FIG. 5 illustrates an annular electrode structure having graphite foil to form conductive fins between adjacent segments.

As shown in FIG. 4, it may sometimes be desirable to provide the prismatic segments such as segment 40 with a coating of conductive material 41 to form conductive fins between adjacent segments and over that face of the segment which is to lie in contact with the cathode current collector. For this purpose a pre-shaped sheet of graphite foil may be applied over the individual segments. If the segments are joined by webs, such as sheet 42 of graphite foil may be put over the upper surface of an electrode assembly preform (e.g. the assembly of FIG. 2) so that, as shown in FIG. 5, the sheet 42 extends over each of the segments around the inner surface of the annular member and lies between the segments to define the fins of high electronic conductivity.

The matrix material put in the mould may comprise a composite formed of two or more different materials.

It will be seen that by the technique described above, an electrode assembly is formed which, because of the mould design, is accurately shaped. The electrode assemblies may be made with negligible wastage of matrix material in the construction of the preform. The matrix material is under a uniform radial compression. This radial compression can be kept quite small but, because of the accurate dimensioning, even with the poor elasticity of the felt, the material can expand enough to contact the current collector and electrolyte when the cell is heated after assembly.

Although, in the method described above, the sulphur is fed into the mould after the mould is closed to compress the matrix material, in some cases it may be preferred to impregnate the matrix material with the sulphur before putting it into the mould.

Figure 6:
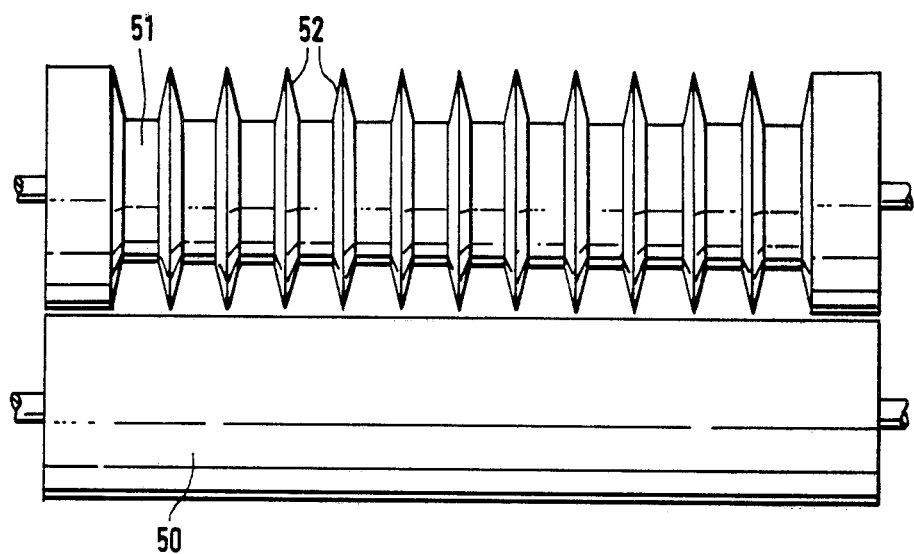
FIG. 6 shows a pair of rolls for use in another method of forming an electrode assembly.

FIG. 6 illustrates diagrammatically a pair of rolls between which sulphur-impregnated matrix material may be passed in another way of forming the shaped electrode assembly. One roll 50 is cylindrical and the other roll 51 has a plurality of circumferential ribs 52. The impregnated material is fed between the rolls with the sulphur molten and is then cooled by a coolant fluid, e.g. by immersion in water or by a blast of cold air to cause the sulphur to solidify as the material comes out of the nip of the rolls so forming a long strip from which lengths are cut to form electrode assemblies.

Figure 7:
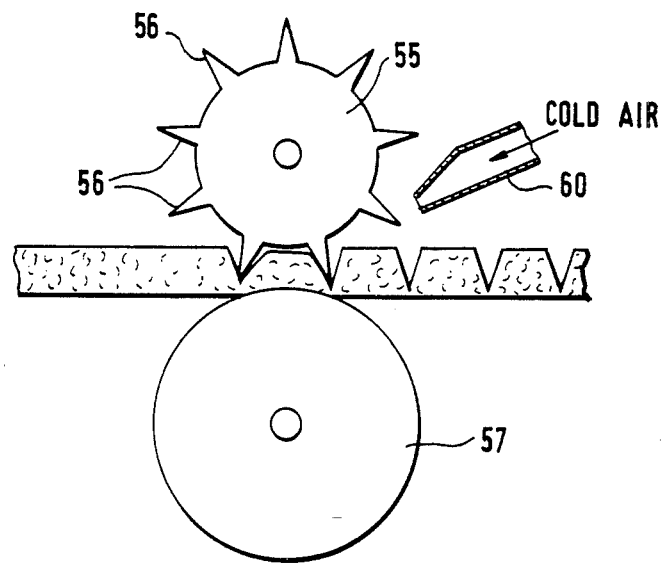
FIG. 7 shows another construction of rolls for use in yet another method of forming an electrode assembly.

Instead of having circumferential ribs 52 to form webs in the electrode assembly parallel to the direction of movement of the matrix material, the rolls may be formed, as shown in FIG. 7, with one roll 55 having longitudinal ribs 56, i.e. ribs parallel to the axis of the roll. The other roll 57 is cylindrical and thus, as a strip 58 of matrix material passes between the rolls 55, 57, webs 59 are formed in the electrode assembly parallel to the axes of the rolls. The sulphur is solidified as the assembly leaves the rolls by a coolant fluid, e.g. by immersion in water or by a jet of cold air as shown diagrammatically at 60.

I claim:

1. In an electro-chemical cell, an annular cathodic electrode structure having a porous matrix of electronically-conductive material impregnated with an electro-chemical reactant material which is solid at room temperature and comprising a plurality of segments shaped as elongated members of trapezoidal form in cross-section, each of which segments is joined to at least one of its neighbouring segments along a longer edge of the segment, which edge is an edge defined by the end of the longer parallel side of the trapezoid in cross-section.

2. In a sodium sulphur cell, an annular cathodic electrode structure for the cathode of the cell, comprising a sulphur-impregnated fibrous carbon or graphite matrix in the form of a plurality of elongated segments of trapezoidal section joined by webs and foldable to form a substantially annular structure.

3. In an electro-chemical cell, an annular cathodic electrode structure formed of a plurality of segments of trapezoidal shape and formed of an electronically-conductive material impregnated with an electro-chemical reactant wherein electrically-conductive sheet material is arranged in the space between the segments to form conductive inserts in the electrode structure.

4. An annular electrode structure as claimed in claim 3 wherein the segments are joined, one to another, by webs along the longitudinal edges of segments adjacent the outer periphery of the structure such that the structure is formable by folding the segments, using the webs as hinges.

5. An annular electrode structure as claimed in claim 3 wherein the sheet material is a metal chemically resistant to the cathodic reactant in the cell operating conditions.

6. An annular electrode structure as claimed in claim 3 wherein the sheet material is graphite foil.

7. An annular electrode structure as claimed in claim 4 wherein a single pre-shaped sheet extends over the inner faces of the segments and between the segments.

8. In a sodium-sulphur cell, an annular cathode electrode for the cell comprising a plurality of segments, each of trapezoidal cross-section, of fibrous carbonaceous material impregnated with sulphur or sodium polysulphides, the segments being shaped to form an annular structure with radially-extending surfaces of adjacent segments separated by electrically-conductive sheet material which is chemically inert to the sulphur/polysulphides.

* * * * *

UNITED STATES PATENT AND TRADEMARK OFFICE
CERTIFICATE OF CORRECTION

PATENT NO. : 4,243,733
DATED : January 6, 1981
INVENTOR(S) : Michael P. J. Brennan It is certified that error appears in the above–identified patent and that said Letters Patent are hereby corrected as shown below:

On title page, after "[62] Div. of Serial No. 861,924, December 19, 1977, Patent No. 4,176,447.", insert --[30] Foreign Application Priority Data December 20, 1976 [GB] United Kingdom ........ 53197/76--.

Signed and Sealed this

Twenty-eighth Day of April 1981

[SEAL]

Attest:

RENE D. TEGTMEYER

Attesting Officer

Acting Commissioner of Patents and Trademarks